W. G. FAY.
EYEGLASS MOUNT.
APPLICATION FILED JULY 20, 1909.
958,485.
Patented May 17, 1910.
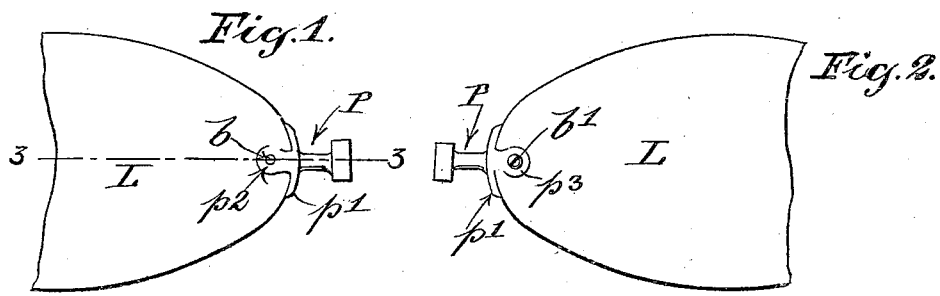
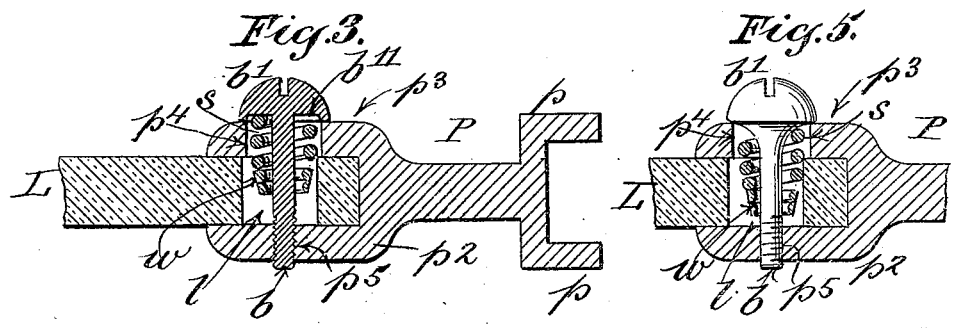
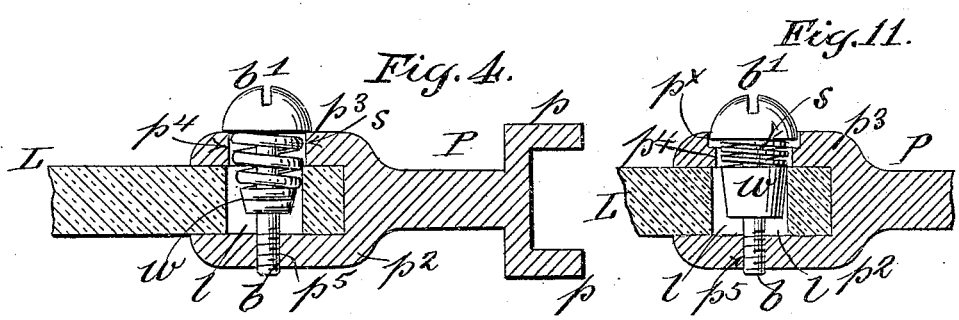
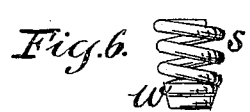 
 
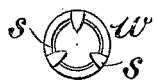
Witnesses:
Lillia Miatt.
D. W. Gardner
Inventor:
Waldo G. Fay
By his Attorney
Geo. W. Miatt

UNITED STATES PATENT OFFICE.

WALDO G. FAY, OF PELHAM, NEW YORK.

EYEGLASS-MOUNT.

958,485.  Specification of Letters Patent.  Patented May 17, 1910.

Application filed July 20, 1909. Serial No. 508,635.

*To all whom it may concern:*

Be it known that I, WALDO G. FAY, a citizen of the United States, residing at Pelham, Westchester county, and State of New York, have invented certain new and useful Improvements in Eyeglass-Mounts, of which the following is a specification.

My improvements relate to a resilient clutch for securing a lens to its post substantially as set forth in Letters Patent No. 907,764 issued to me December 29, 1908, in which a wedge shaped sleeve on a screw bolt is pressed into the perforation in the lens by a spring interposed between said wedge shaped sleeve and a cap nut engaging the end of the screw bolt.

It is the object of the present invention to simplify the construction and arrangement of the parts and dispense with the cap nut while retaining all the inherent advantages of the resilient wedge clutch; and the invention consists in the specific construction and arrangement of parts hereinafter described and claimed specifically.

In the accompanying drawings, Figure 1, is a rear elevation of my improved mount and a portion of the lens; Fig. 2, a front elevation of the same; Fig. 3, is a section upon plane of line 3—3 Fig. 1, upon an enlarged scale; Fig. 4, a similar view showing certain parts in elevation; Fig. 5, is a sectional elevation showing the use of an ordinary form of screw bolt; Figs. 6, 7 and 9, are elevations of forms of my resilient wedge sleeve made in one piece; Fig. 8, is an end view of the form shown in Fig. 7; Fig. 10, is an end view of the form shown in Fig. 9; Fig. 11, is a view similar to Fig. 5, showing a modification in which the wedge sleeve and spring are separate pieces, and in which the head of the screw is countersunk.

L, represents an eye-glass secured to the post P. The inner end of the post P, is formed with the usual parallel flanges $p$, $p$, for the reception of the end of the bow or bridge spring, which is secured to the post in any desired or well known manner. The base or inner portion of the post P is formed with the usual strap $p'$, which bears against the rim of the lens L, and with the side bearings $p^2$, $p^3$, overlaping the sides thereof.

The old method of fastening a lens to a post was by means of a screw passing through a hole in one side bearing and through the perforation in the lens, and engaging a female screw thread in the other side bearing of the post. This constituted a rigid connection which was objectionable on account of the brittle character of the lens, as set forth in my Letters Patent above recited, to which reference may be had for an understanding of the benefits derived from the use of the resilient clutch for attaching the lens to the post. In the patent referred to I use a cap nut, which, by my present construction and arrangement of parts I am enabled to dispense with, interposing the spring between the wedge sleeve and the head of the bolt, as hereinafter described. To this end I make the hole $p^4$, in the side bearing $p^3$, the same size as the perforation $l$, in the lens L, and form the other side bearing $p^2$, with a female screw thread $p^5$, in axial alinement with the hole $p^4$, in the first mentioned side bearing $p^3$. The threaded end $b$, of the bolt engaging with the screw thread $p^5$, and its head $b'$, is of sufficient diameter preferably, to overlap the edges of the hole $p^4$, in the side member $p^3$, although this is not essential provided the head is of sufficient diameter to engage with and form a shoulder for the resilient spring $s$. In fact, if desired the hole $p^4$, may be formed with a countersink $p^x$, for the head $b'$, of the bolt, as indicated in Fig. 11, in which case the screw has a greater margin of adjustment, and the protrusion of the head is lessened.

In my aforesaid Letters Patent the wedge sleeve $w$, is shown as formed of a separate piece from the spring $s$, and it is also so shown in Fig. 11, of the present case, and may be thus made and used to advantage; but a special feature of my present invention consists in making the spring $s$, and the wedge sleeve $w$, in one piece, and this may be accomplished with like result in various ways. Thus in Figs. 3, 4, 5 and 6, the spiral metallic wire is made conical in external outline, the lower convolutions constituting the wedge $w$, and the upper convolutions the resilient portion or spring $s$. In Figs. 7, 8, 9 and 10, the wedge $w$, is also formed integral with the spring $s$, the latter consisting in Figs. 7 and 8, of flat spiral convolutions cut from the base or wedge $w$, whereas in Figs. 9 and 10, spring tongues project upward from the wedge. In either case the result is the same in that a resilient medium or spring $s$, is interposed between the wedge sleeve $w$, and head $b'$, of the screw bolt.

The screw bolt shown in Fig. 5, is of ordinary construction, whereas that shown in Fig. 3, is of special construction, the underside of the head being formed with a countersink $b''$, to receive the upper end of the spring $s$. This admits of the use of a longer spring or resilient portion of the wedge sleeve, and prevents slipping of spring.

The pressure of the spring $s$, against the wedge sleeve $w$, insures an intimate engagement and interlocking of the parts sufficient to sustain the lens firmly in position under ordinary conditions of use, while at the same time the resilience of the spring affords a degree of elasticity and flexibility sufficient to allow the parts to adapt themselves within prescribed limits to undue strain. The spring also allows and compensates for expansion and contraction of the parts under variations in temperature, and maintains a practically uniform pressure and contact thereof under all circumstances. Hence the lens is kept from working loose, being held in position by the wedge sleeve which in turn is supported and centralized by the screw bolt. The wedge also keeps the lens tight against the strap for its entire length, and as the strap is formed to fit the edge of the lens it cannot bend back and become loose.

It will be seen that I attain all the practical advantages incidental to the use of the conical wedge sleeve in a cheaper and simpler manner than that disclosed in my aforesaid Letters Patent, at the same time dispensing with the need of a cap nut, and obviating undue protrusion of parts.

What I claim as my invention and desire to secure by Letters Patent is,

1. In a lens mount of the character set forth, the combination of the perforated lens, a lens post formed with perforated side bearings, one of which is formed with a female screw thread, a screw bolt passing through one side bearing and through the perforation in the lens and engaging with the female screw thread in the other side bearing, a wedge sleeve on said bolt projecting into the perforation in the lens, and a spring interposed between said wedge and the head of the screw bolt.

2. In a lens mount of the character set forth, the combination of the perforated lens, a lens post formed with perforated side bearings, one of which is formed with a female screw thread, a screw bolt passing through one side bearing and through the perforation in the lens and engaging with the female screw thread in the other side bearing, a wedge sleeve on said bolt projecting into the perforation in the lens, and a spring interposed between said wedge sleeve and the head of the screw bolt, said wedge sleeve and said spring being formed integral.

3. In a lens mount of the character set forth, the combination of the perforated lens, a lens post formed with perforated side bearings, one of which is formed with a female screw thread, a screw bolt passing through one side bearing and through the perforation in the lens and engaging with the female screw thread in the other side bearing, a wedge sleeve on said bolt projecting into the perforation in the lens, and a spring interposed between said wedge sleeve and the head of the screw bolt, said wedge sleeve and said spring being formed integral of a single piece of metallic wire.

4. In a lens mount of the character set forth, the combination of the perforated lens, a lens post formed with perforated side bearings, one of which is formed with a female screw thread, a screw bolt passing through one side bearing and through the perforation in the lens and engaging with the female screw thread in the other side bearing, a wedge sleeve on said bolt projecting into the perforation in the lens, and a spring interposed between said wedge sleeve and the head of the screw bolt, said screw bolt being formed with a countersink on the under side of its head, for the purpose described.

WALDO G. FAY.

Witnesses:
 GEO. WM. MIATT,
 D. W. GARDNER.